June 22, 1926.
A. F. MASURY ET AL
1,589,611
CUSHION CONNECTION FOR VEHICLE CONSTRUCTION
Filed July 25, 1924   2 Sheets-Sheet 2
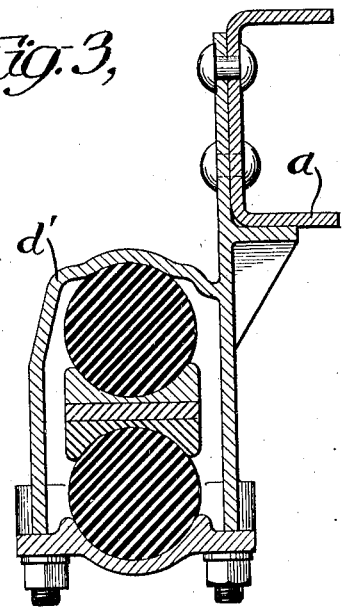
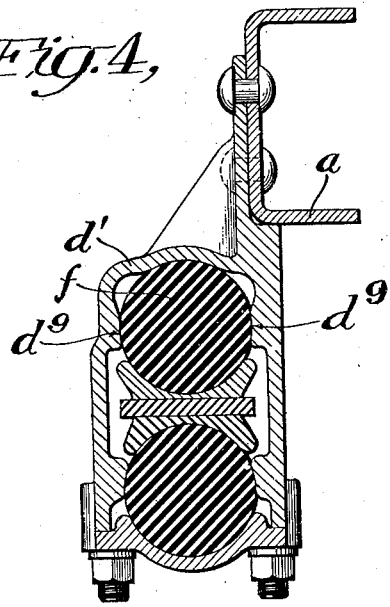
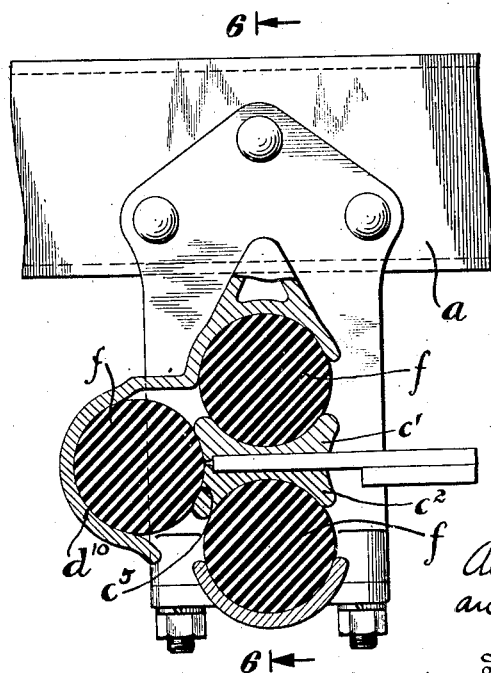
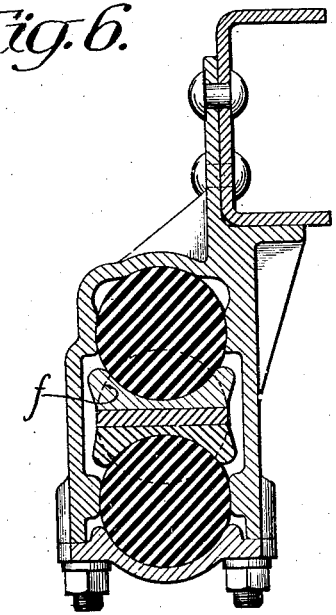

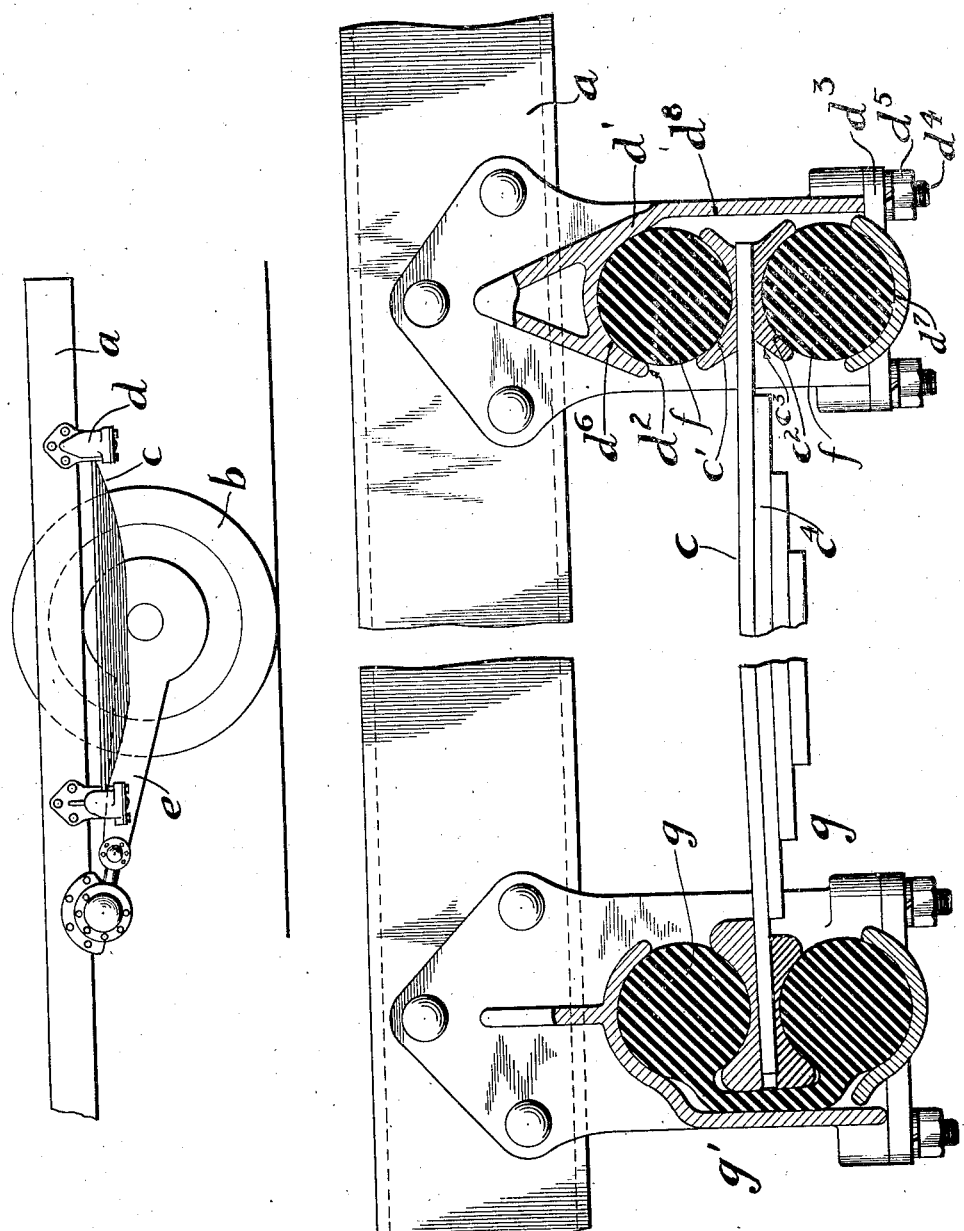

Patented June 22, 1926.

1,589,611

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed July 25, 1924. Serial No. 728,064.

This invention relates to a non-metallic connection and support between two metallic parts of a vehicle, one of which parts is to be connected to and supported by the other of said parts and more particularly to a connection and support of yielding non-metallic material between the chassis or axle and the spring in a motor vehicle.

In U. S. Patent No. 1,404,876 issued to Alfred F. Masury and August H. Leipert January 31, 1922, there is disclosed a wholly non-metallic mechanical connection and support between metallic parts of a chassis, one of which parts, is to be connected to and supported by the other part with provision for relative movement therebetween. This connection and support comprises yielding non-metallic material and serves to cushion the shocks and vibrations impressed upon either of the connected parts. The connection also affords relative movement between the connected parts of the vehicle by a distortion of the yielding non-metallic material.

It is one object of the present invention to absorb or cushion shocks and vibrations impressed upon the parts connected and to permit relative movement to a degree between the parts. To this end advantage is taken of the tendency to distortion of the yielding non-metallic material in a connection of this character. Another object of the invention is to facilitate relative movement of the parts connected. To this end provision is made for displacement, to a degree, of the connection with respect to one or more of the parts connected. A further object of the invention is to make provision for a reduction of the amount of wear of the contacting surfaces of the material in a connection and support of the character described. To this end the engaging surfaces of the parts to be connected and the connection are formed as co-operating spherical surfaces whereby relative movement between the connection and the connected parts is permitted. More particularly the invention contemplates the provision of a block of yielding non-metallic material which is substantially spherical in form and which is interposed between, for instance, the spring and the chassis of a motor vehicle, the engaging metallic surfaces of the spring and chassis respectively being cup-shaped, if desired, to facilitate the retention of the parts in effective relation. In many situations it may be found desirable to place the yielding non-metallic material under internal static pressure whereby the strength, resiliency and wearing qualities of the material is increased. To this end the rubber blocks may be made somewhat oversize whereby, upon assembly, they may be retained under compression for the purpose specified.

These and other objects of the invention and the means for their attainment will be more apparent from the following detailed description of preferred embodiments thereof illustrated in the accompanying drawings and in which:

Figure 1 is a diagrammatic view of so much of a wheel and frame of a motor vehicle as is necessary for an understanding of the application of the improved cushion connection thereto.

Figure 2 is a fragmentary view, partly in section, showing the interposition of the connection according to the present invention between a spring and side frame member of a vehicle.

Figure 3 is a fragmentary view in transverse vertical section showing a modified construction of the housing for the connection which permits, to a degree, transverse movement of the spring with respect to the frame.

Figure 4 is a fragmentary view in transverse vertical section similar to Figure 3 but showing means whereby transverse movement of the spring with respect to the vehicle frame is overcome.

Figure 5 is a fragmentary view, partly in elevation, and showing a modification of the invention.

Figure 6 is a sectional view taken in the plane indicated by the line 6—6 in Figure 5 and looking in the direction of the arrows.

Referring to Figure 1 it will be observed that the invention is shown as applied between the chassis frame and spring carried with the driving axle of a motor vehicle but as the description proceeds it will be apparent that the invention is not to be limited to such use but is applicable not only in any situation wherein a chassis is to be supported from a spring in a motor vehicle but wherever two relatively movable parts are to be connected with provision for cushioning or absorbing the shocks or stresses impressed upon one such part to prevent their transmission to the other part. As shown in Figure 1 the chassis frame $a$ is supported from the vehicle wheel $b$ by the usual leaf spring $c$ which is connected to the frame through the instrumentality of yielding non-metallic connections contained within the housings indicated generally at $d$.

Figure 2 shows in detail cushion connections according to the present invention. At the right of this figure is shown one of the simplest forms taken by the present invention and which is applicable, for instance, at both ends of a vehicle spring where a radius rod such as indicated at $e$ in Figure 1 is provided for the transmission of driving forces to the body of the vehicle. According to this modification a housing $d'$ is supported from the side frame member $a$ of the vehicle and is formed with an opening $d^2$ in the side thereof facing the spring $c$ for the reception of the proximate end of the spring. The lower part of the housing is also open and is adapted to be closed by a closure or cap $d^3$ secured in any convenient manner as by bolts $d^4$ and the nuts $d^5$. Between the end of the spring and the housing is adapted to be interposed blocks $f$ of yielding non-metallic material, substantially spherical in form, and resting in substantially spherical seats or cups $d^6$ in the housing $d'$ and $d^7$ in the closure $d^3$. Co-operating cup-like seats $c'$, $c^2$ may also be provided on the end of the spring. It will be observed that upon reference to the right-hand side of Figure 2 that the cup $c^2$ is cut away as at $c^3$ to provide for relative movement of the leaf $c^4$ of spring $c$ during spring elongation. The rear wall of the housing $d'$ is offset slightly as at $d^8$ to permit spring elongation without contact with the rear wall.

Referring to Figure 3 it will be observed that the side walls of the housing $d'$ are spaced considerably from the spherical blocks $f$ and spring $c$ whereby a certain degree of relative movement of the spring in a transverse direction is permitted without contact with the walls of the housing. If desired, however, provision may be made for overcoming this transverse movement of the spring by forming abutments $d^9$ (Figure 4) to engage the spherical blocks of rubber $f$ on opposite sides thereof to prevent their relative movement in a transverse direction.

In situations such as would arise, for instance, in the so called Hotchkiss drive where the driving forces are transmitted from the axle to the body through the springs provision may be made for cushioning the thrust at the end of the spring. To this end spherical blocks $g$, $g$ of yielding non-metallic material are joined by a relatively narrow connecting strip $g'$ which is interposed between the rear wall of the housing and the proximate end of the spring. Upon spring elongation the end of the spring and, of course, the cups carried thereby will engage the rubber connecting cushion $g'$ in a manner which will be well understood. Abutments $d^9$ adapted to overcome side-sway may be provided in the housing according to this modification of the invention if desired.

While the relation of parts illustrated in Figure 2 has been described as particularly advantageous in connection with a spring suspension for the so called Hotchkiss drive it will be apparent to those skilled in the art that by a reversal of connections at the end of the spring a particularly efficacious disposition of cushion connections is provided for use in a trailer, for instance, where the forces are transmitted from the body to the wheels. This disposition of parts is also advantageous in connection with some front spring suspensions where the steering forces are applied through a drag link to the wheel from a point in rear of the rearwardly disposed spring connection.

For a modification of the construction at the left-hand side of Figure 2 reference will now be had to Figures 5 and 6 wherein spherical bodies of yielding non-metallic material are disposed as heretofore within cup-like seats above and below the end of a spring. In this instance, however, the rear wall of the housing is also formed with a spherical seat $d^{10}$ and a co-operating cup $c^5$ is formed by the ends of the cups $c'$, $c^2$. Between seats $c^5$ and $d^{10}$ is disposed according to this modification a third ball of yielding non-metallic material $f$ which serves to cushion the longitudinal forces transmitted by the spring.

While various varieties of yielding non-metallic material will undoubtedly occur to those skilled in the art it has been found advantageous to adopt rubber as the material for the present connections.

It will thus be seen that a yielding non-metallic connection and support has been provided between relatively movable parts of a motor vehicle whereby shocks and stresses upon either of the parts may be cushioned or absorbed rather than be transmitted with undiminished intensity to the other part. While relative movement to a degree is permitted by distortion of the yielding non-metallic material such relative movement is also facilitated by displacement of the spherical blocks with respect to the spherical cups or seats within which they are disposed. This displacement also serves the added function of permitting new wearing surfaces of the non-metallic blocks to come in contact with the engaging surfaces of the metal whereby wear is distributed and the life of the blocks increased.

While various combinations of spherical bodies of yielding non-metallic material have been disclosed in the accompanying drawings and hereinbefore discribed it is to be understood that the invention is not to be limited to the particular combinations described and illustrated but that the use of any number of such blocks, either one or a plurality, is to be considered within the purview of the present invention and no limitation is intended except as indicated in the appended claims.

What we claim is:

1. A wholly non-metallic connection and support interposed between two metallic parts of a vehicle, one of which parts is to be connected to and supported by the other of said parts, comprising a block of yielding non-metallic material, and means to mount said block upon said supported member and seat the same upon the supporting member with provision for relative movement between the block and both of said parts.

2. In combination with the spring and frame of a motor vehicle, a wholly non-metallic mechanical connection and support interposed between an end of the spring and the frame and comprising a plurality of spherical blocks of non-metallic material engaging the end of the spring, and a housing secured to the frame and maintaining the said blocks in predetermined position with respect to the frame, means being provided to permit relative movement of the blocks with respect to each other and to the support.

3. A wholly non-metallic mechanical connection and support interposed between the spring and frame of a vehicle, and comprising a housing carried with the frame and having an open side into which the end of the spring extends, cups carried upon opposite sides of the end of the spring, co-operating cups formed in the housing, and spherical blocks of yielding non-metallic material disposed between the cups.

4. A wholly-metallic mechanical connection and support interposed between the spring and frame of a vehicle, and comprising a housing carried with the frame and having an open side into which the end of the spring extends, a cup disposed upon opposite sides of the end of the spring, co-operating cups formed in the housing, a cup formed on the end of the spring, a co-operating cup formed in the wall of the housing, and spherical blocks of yielding non-metallic material disposed between the cups.

5. In combination with a motor vehicle, a wholly non-metallic mechanical connection and support interposed between two parts of the vehicle and comprising a spherical block of non-metallic material engaging one of said parts, and means secured to the other part, and maintaining said block in predetermined position with respect thereto, means being provided to permit relative movement of the block with respect to both parts.

This specification signed this 24 day of July, A. D. 1924.

ALFRED F. MASURY.
AUGUST H. LEIPERT.